No. 750,611. PATENTED JAN. 26, 1904.
A. M. COX.
WIND WHEEL.
APPLICATION FILED JULY 6, 1903.
NO MODEL.
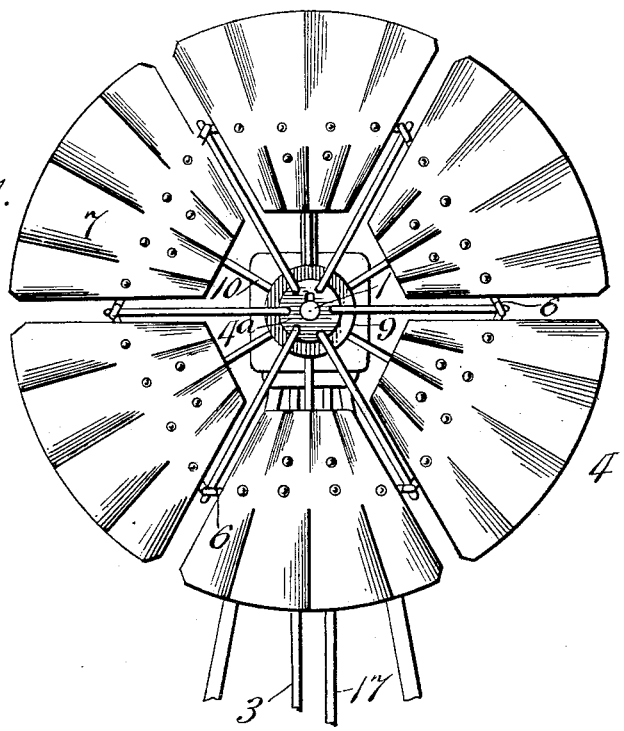
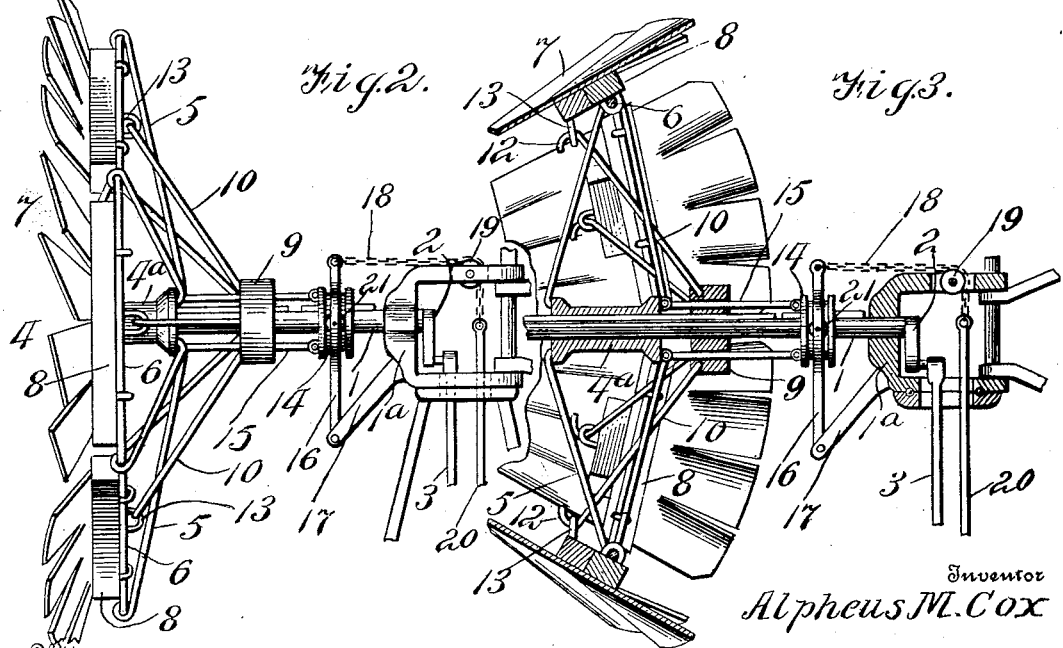
Inventor
Alpheus M. Cox
Witnesses
G. V. Worthington
By H. B. Wilson
Attorney No. 750,611. Patented January 26, 1904.

UNITED STATES PATENT OFFICE.

ALPHEUS M. COX, OF HAVILAND, KANSAS.

WIND-WHEEL.

SPECIFICATION forming part of Letters Patent No. 750,611, dated January 26, 1904.

Application filed July 6, 1903. Serial No. 164,382. (No model.)

*To all whom it may concern:*

Be it known that I, ALPHEUS M. COX, a citizen of the United States, residing at Haviland, in the county of Kiowa and State of Kansas, have invented certain new and useful Improvements in Wind-Wheels; and I do declare the following to be a full, clear, and exact description of the invention, such as will enable others skilled in the art to which it appertains to make and use the same.

This invention relates to improvements in wind-wheels.

The object of the invention is to provide a wind-wheel which will adjust itself automatically to the varying conditions of the wind.

A further object is to provide a wind-wheel of this character which will be simple, strong and durable, efficient, and reliable in operation, consisting of comparatively few parts which will not easily get out of order.

With these and other objects in view the invention consists of certain novel features of construction, combination, and arrangement of parts, as will be more fully described, and particularly pointed out in the appended claims.

Figure 1 is a front elevation of the wind-wheel, showing the blades in operative position. Fig. 2 is a side elevation of the same. Fig. 3 is a longitudinal vertical section of the wheel, showing the blades closed.

In the drawings, 1 denotes the shaft, adapted to be suitably journaled in a bearing 1ª, formed on the top of a tower in the usual manner and provided with the usual crank 2, to which is connected the upper end of the pump-rod 3.

4 denotes the wind-wheel, consisting of an outer hub 4ª, slidably mounted on the end of the shaft 1, and to the inner and outer ends of the hub are connected the inner ends of spokes 5, arranged in pairs, the spokes in each pair inclining toward each other and meeting at their outer ends. The said meeting ends of each pair of spokes are connected together by a series of bars or rods 6. Any number of pairs of spokes may be used, six pair being shown in the drawings, the rods 6, which connect the ends of the same together, forming a six-sided figure.

7 denotes the fan-blades, which are arranged in sections, there being preferably four blades to each section formed of sheet metal and fixed to cross-bars 8, the outer ends of the fan-blades being bent or given a slight twist in order to catch the wind. The bars 8, carrying the blades 7, are adapted to have a pivotal connection with the bars or rods 6 to permit the fan-blades to be tilted or rocked into and out of the wind.

9 denotes an inner hub fixed to the shaft 1, and to said hub are fixed the inner ends of radial diverging spring-arms 10, the outer ends of which are bent inwardly to form hooks 12, which are adapted to have a loose connection with an eye or staple 13, formed on the fan-blade sections inside the pivotal point of the same, so as to normally hold said sections out or to the wind. When, however, the wind blows with such force that there is danger of breaking some of the parts, the hub 4ª and the parts carried thereby will be forced backward toward the inner fixed hub 9, the connection of the arms 10 with the fan-sections causing the same to be titled or rocked back on the bars or rods 6. The backward movement of these parts also acts upon the tension of the spring-arms 10, so that as soon as the pressure of the wind is relieved said arms will force the parts outwardly again, the hooked ends of the arms engaging the eye or staple 13 on the fan-sections and pulling them out square to the wind, as will be understood.

In order to manually shift the hub 4ª and the parts carried thereby to turn the fan-sections out of the wind, suitable mechanism is employed, which will now be described.

On shaft 1 in rear of the hub 9 is slidably mounted a grooved collar 14, which is adapted to be connected to the hub 4ª by means of rods 15, which pass through the hub 9, one end of said rods being connected to the hub 4 and the opposite ends to the collar 14.

16 denotes a lever suitably mounted in a bracket 17, formed on the bearing 1ª of the shaft 1 below the collar 14. The lever 16 is forked to embrace the grooved collar 14 and then extended upwardly and the ends of the same brought together above the collar. To the upper end of the lever is connected one end of a chain 18, which runs over a pulley 19, journaled in the upper end of the head 1ᵃ and is connected at its opposite end to an operating rod or wire 20, arranged in the tower, and by which the hub may be shifted to throw the blades out of the wind. Upon releasing the rod or wire 20 the spring-arms 10 will again force the blades to the wind. Friction-rollers 21 may be mounted on the forked arms of the lever 16, where the same engages the grooved collar to enable the same to be more readily worked.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. In a wind-wheel the combination with a suitably-mounted shaft, of a wheel slidably mounted upon the outer end of said shaft, pivoted fan-blade sections carried by said wheel, a hub fixedly mounted upon said shaft in rear of said wheel, radially-diverging, spring-arms having one end connected to said hub and formed on their opposite ends with hooks which are adapted to have a loose connection with said fan-blade sections, whereby, upon the inward or outward movement of said wheel said fan-sections will be thrown out of or into operation, and means for moving said wheel inwardly or outwardly, substantially as described.

2. In a wind-wheel, the combination with a suitably-mounted shaft, of a wheel slidably mounted upon the outer end of said shaft, pivoted fan-blade sections carried by said wheel, a hub fixedly mounted upon said shaft in rear of said wheel, radially-diverging spring-arms having one end connected to said hub and formed on their opposite ends with hooks which are adapted to have a loose connection with said fan-blade sections, whereby, upon the inward or outward movement of said wheel, said fan-sections will be thrown out of or into operation, a grooved collar slidably mounted on said shaft, rods connecting said collar with the hub of said wheel, a lever suitably mounted upon the bearing of said shaft, said lever being forked and adapted to engage said grooved collar, and an operating chain and rod connected to the upper end of said lever whereby the same may be rocked to manually shift said wheel to throw said fan-blade sections out of operation, substantially as described.

In testimony whereof I have hereunto set my hand in presence of two subscribing witnesses.

ALPHEUS M. COX.

Witnesses:
N. H. MENDENHALL,
E. B. MENDENHALL.